United States Patent
Lengerich et al.

(10) Patent No.: US 6,595,765 B1
(45) Date of Patent: Jul. 22, 2003

(54) DEVICE FOR HOMOGENIZING, MIXING AND/OR GRANULATING CHEMICAL SUBSTANCES

(75) Inventors: Bernhard Van Lengerich, Plymouth, MN (US); Bernhard Stadler, Niederuzwil (CH); Alfred Zünd, Niederuzwil (CH); Konrad Munz, Neukirch an der Thur (CH); Federice Innerebner, Zürich (CH); Fritz Feurer, Zuzwil (CH)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 09/269,223

(22) PCT Filed: Sep. 18, 1997

(86) PCT No.: PCT/CH97/00353

§ 371 (c)(1),
(2), (4) Date: Nov. 8, 1999

(87) PCT Pub. No.: WO98/13181

PCT Pub. Date: Apr. 2, 1998

(30) Foreign Application Priority Data

Sep. 23, 1996 (DE) .......................................... 196 38 994

(51) Int. Cl.[7] .............................................. B29C 47/86
(52) U.S. Cl. .................... 425/131.1; 425/203; 425/205; 425/311; 425/378.2; 425/463
(58) Field of Search ................ 425/DIG. 243, 425/131.1, 131.5, 311, 313, 203, 205, 378.2, 379.1, 463

(56) References Cited

U.S. PATENT DOCUMENTS

| | | | | |
|---|---|---|---|---|
| 2,401,236 A | * | 5/1946 | Fielitz | 425/313 |
| 3,516,120 A | * | 6/1970 | Braun et al. | 425/67 |
| 3,609,828 A | * | 10/1971 | Compa et al. | 425/131.1 |
| 3,618,162 A | * | 11/1971 | Scharer et al. | 425/67 |
| 3,884,607 A | * | 5/1975 | Gerhards | 425/144 |
| 3,918,865 A | * | 11/1975 | Nissel | 425/131.1 |
| 4,099,455 A | * | 7/1978 | Wenger et al. | 99/450.1 |
| 4,123,207 A | | 10/1978 | Dudley | |
| 4,251,198 A | * | 2/1981 | Altenburg | 425/67 |
| 4,321,026 A | | 3/1982 | Lambertus | |
| 4,378,964 A | * | 4/1983 | Wolfe, Jr. | 425/463 |
| 4,421,470 A | | 12/1983 | Nakamura | |
| 4,678,423 A | * | 7/1987 | Bertolotti | 425/311 |
| 4,720,251 A | | 1/1988 | Mallay et al. | |
| 4,764,100 A | | 8/1988 | Lambertus | |
| 4,856,974 A | | 8/1989 | Wolfe, Jr. | |
| 5,273,356 A | | 12/1993 | Piccolo, Sr. et al. | |
| 5,587,186 A | * | 12/1996 | Voigt | 425/310 |
| 5,629,028 A | | 5/1997 | Trumbull | |
| 5,714,173 A | * | 2/1998 | Matsuo | 425/67 |
| 5,851,463 A | * | 12/1998 | Guntherberg et al. | 264/101 |

FOREIGN PATENT DOCUMENTS

| | | |
|---|---|---|
| DE | 1 779 926 | 1/1972 |
| EP | 0 140 846 | 5/1985 |
| EP | 0 348 800 | 1/1990 |
| EP | 0 435 023 | 7/1991 |
| EP | 0 578 603 | 1/1994 |

* cited by examiner

*Primary Examiner*—W. L. Walker
*Assistant Examiner*—Emmanuel Luk
(74) *Attorney, Agent, or Firm*—Burns, Doane, Swecker & Mathis, LLP

(57) ABSTRACT

The invention concerns a device for homogenizing, mixing and/or granulating chemicals which consist of at least one component, particularly additives, by means of an extruder consisting of several housing segments, at least one worm, a nozzle arrangement and at least one cutting device.

22 Claims, 5 Drawing Sheets

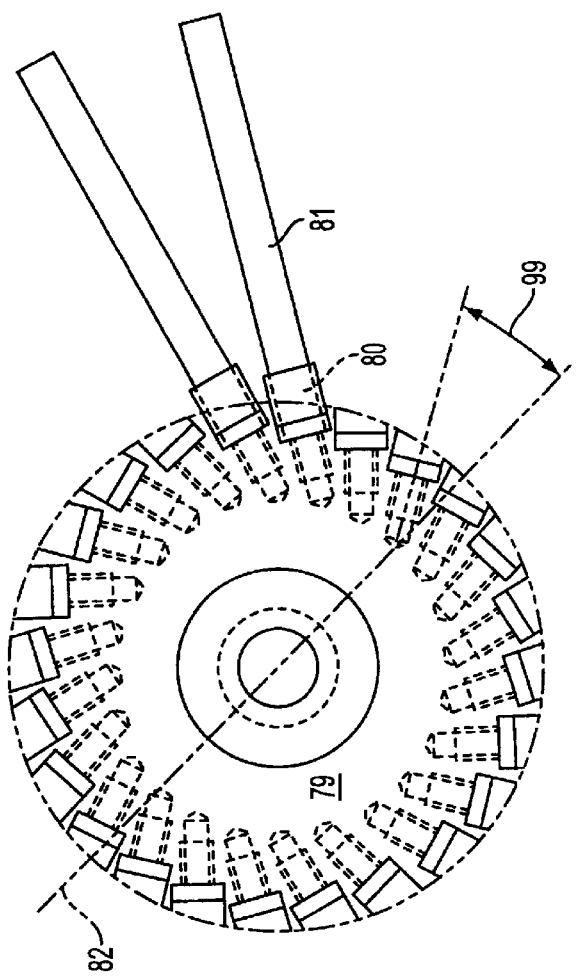
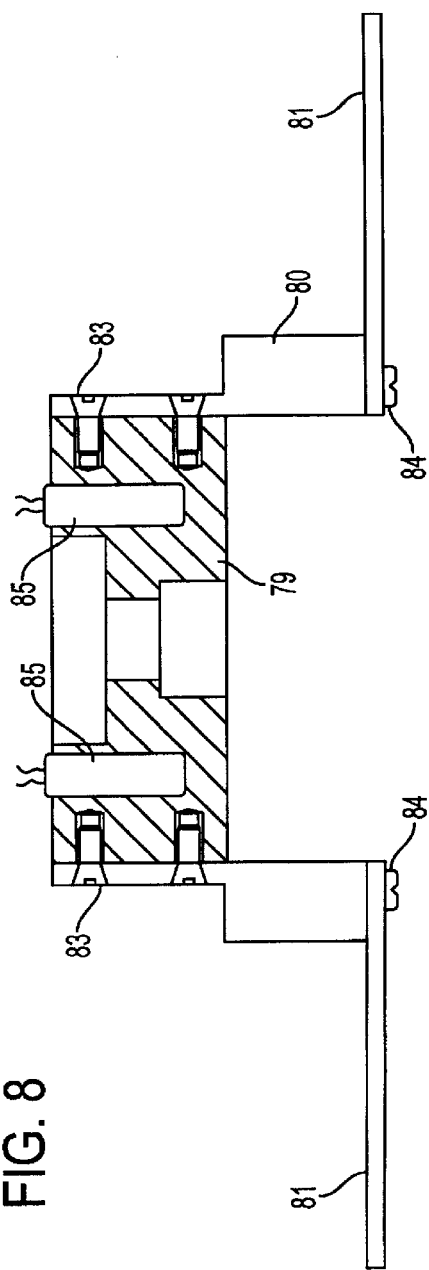
FIG. 8
FIG. 9

DEVICE FOR HOMOGENIZING, MIXING AND/OR GRANULATING CHEMICAL SUBSTANCES

BACKGROUND OF THE INVENTION

1. Field of the Invention

The invention relates to a device for homogenizing, mixing and/or pelletizing chemical substances comprising of at least one component by means of an extruder which exhibits several casing sections, at least one endless screw, a die arrangement and at least one cutting mechanism.

2. State of the Art

Certain pellets of chemical substances, in particular additives, require a high production rate. Since these chemical substances frequently consist of components with the most varied of physical properties (melting point, water content, melting viscosity, miscibility, adhesiveness, etc.), difficulties are encountered during pelletization, in particular at a high throughput. For example, the extruder develops undesired deposits, the dies become clogged, thereby making pelletization more difficult or no longer possible. In addition, the individual components can exhibit varying behavior while being fed in.

Known in the art from DE 38 32 006 A1 is an extruder for pelletizing a molding material and the use of such an extruder. The extruder makes it possible to achieve a uniform distribution of the molding material to be processed over the entire cross section of the forming plate.

DE 39 34 592 describes a perforated plate for pelletizing plastic strands. The perforated plate is designed in such a way as to prevent deposits and associated product contamination.

DE 42 93 549 A1 discloses the fabrication of compacted, superficially sticky pellets as well as the device suitable for executing the process. This process is intended to prevent the pellets from baking on and adhering to the inner wall of the pelletizing shaft, even at very high throughputs and without limiting the range of formulations.

SUMMARY OF THE INVENTION

Therefore, the object of the invention is to propose a device of the aforementioned type which enables an optimal homogenization and mixing of the extrusion mass on the one hand, and a uniform pelletization with the desired pellet properties on the other, both at the highest possible throughput.

According to the invention, the object is achieved by virtue of the fact that the extruder exhibits at least one opening for metering purposes, and that the extruder casing and/or individual die sections are thermally decoupled and separately heatable and/or coolable.

Since the different starting materials have varying temperature properties, it is necessary to set a specific temperature profile throughout the entire extrusion process. In this case, high temperature jumps may become necessary, which are then achieved via the thermal decouplings and ability to heat and/or cool the individual extruder casing sections. The extrusion process often starts out at a high temperature, with a low temperature at the extruder output. A specific endless screw configuration can also help bring about a good result.

To achieve a uniform distribution of the extrusion mass, the extrusion strand is shaped into a ring before entering the die arrangement, with the diameter of the ring-shaped stand increasing toward the die arrangement. In this case, a uniform pressure distribution is in place in front of the dies.

In addition, the invention provides for the use of eccentric dies, in particular during stand pelletization.

The extrusion strand divided into individual die strands can be broken down in an advantageous manner by means of a cutting mechanism located directly in back of the die arrangement or to the side of the extruder.

Additional preferred features and combinations thereof are outlined in the subclaims and following descriptions to the figures.

BRIEF DESCRIPTION OF THE DRAWINGS

Embodiments are illustrated based on the drawings below. Shown on:

FIG. 8 is a knife configuration of the cutting mechanism;

FIG. 9 is a sectional view of the cutting mechanism.

DETAILED DESCRIPTION OF THE PREFERRED EMBODIMENTS

Figure 1:
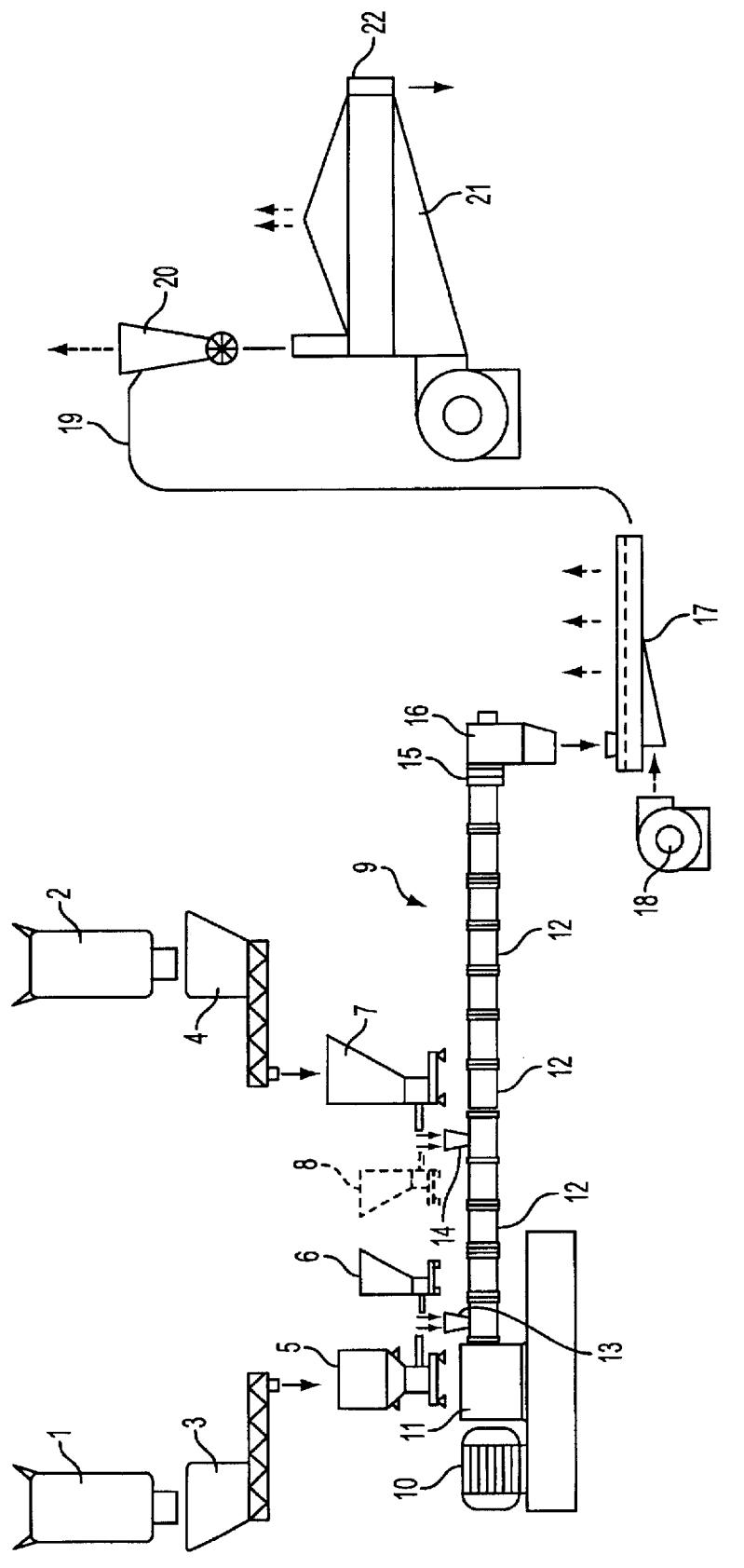
FIG. 1 is a schematic representation of the extrusion process.

FIG. 1 shows an example for a schematic representation of the extrusion process according to the invention. The starting materials are transferred from storage tanks 1 and 2 into feed devices 3 and 4. Depending on the starting materials, the latter are premixed in a mixer 5 or introduced directly into metering devices 6 and 7. Should more components be needed for better process execution, they can be introduced into the process, for example, by means of an additional metering device 8.

Extruder 9 with drive 10 and gearing 11 comprises of several extruder casing sections 12. Individual extruder casing sections 12 exhibit openings 13 and 14 for purposes of metering in. The extruder output has a die arrangement 15, behind which is a cutting mechanism 16. The freshly pelletized final product subsequently makes its way to a conveyor belt 17 for cooling and drying by means of a ventilator 18. For additional drying, the extrudate can be relayed by a conveyor 19, dust removal system or cyclone 20 to a dryer 21, and then to an extractor 22.

Figure 2:
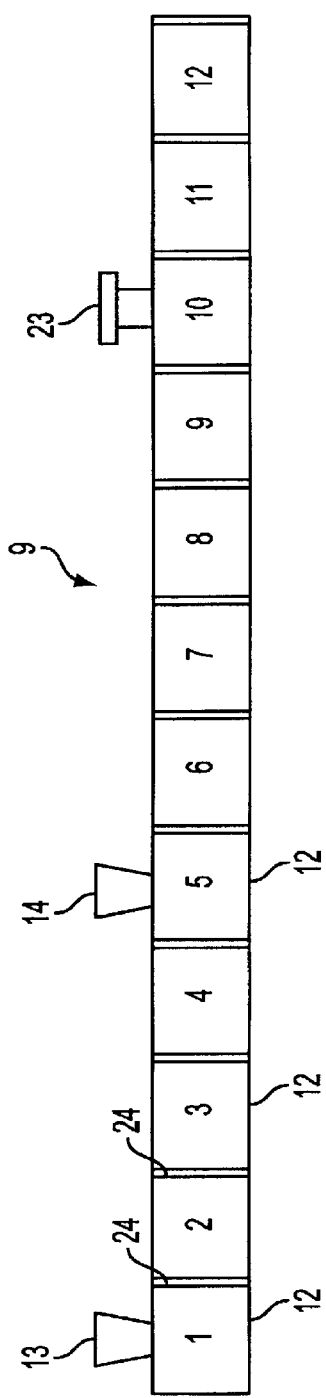
FIG. 2 is a schematic representation of the extruder setup.

FIG. 2 shows a possible extrusion path. Extruder 9 here comprises of twelve extruder casing sections 12, which are separated from each other by disk-shaped insulators 24. This thermal decoupling makes it possible to set a precisely defined temperature profile. It is particularly advantageous to start the extrusion process at a high temperature, and to proceed at a low temperature at the extruder output. The initial temperatures of the casing typically range from 15° C. to 250° C., preferably from 100° C. to 200° C., while the temperature at the last casing section typically ranges from −30° C. to 220° C., preferably from 20° C. to 150° C. However, any product-dependent temperature profile is conceivable. Openings 13 and 14 are used to meter in various components in a staggered manner, if desired. In addition, at least one extruder casing section provides a connection 23 for a vacuum pump in order to remove excess moisture.

Figure 3:
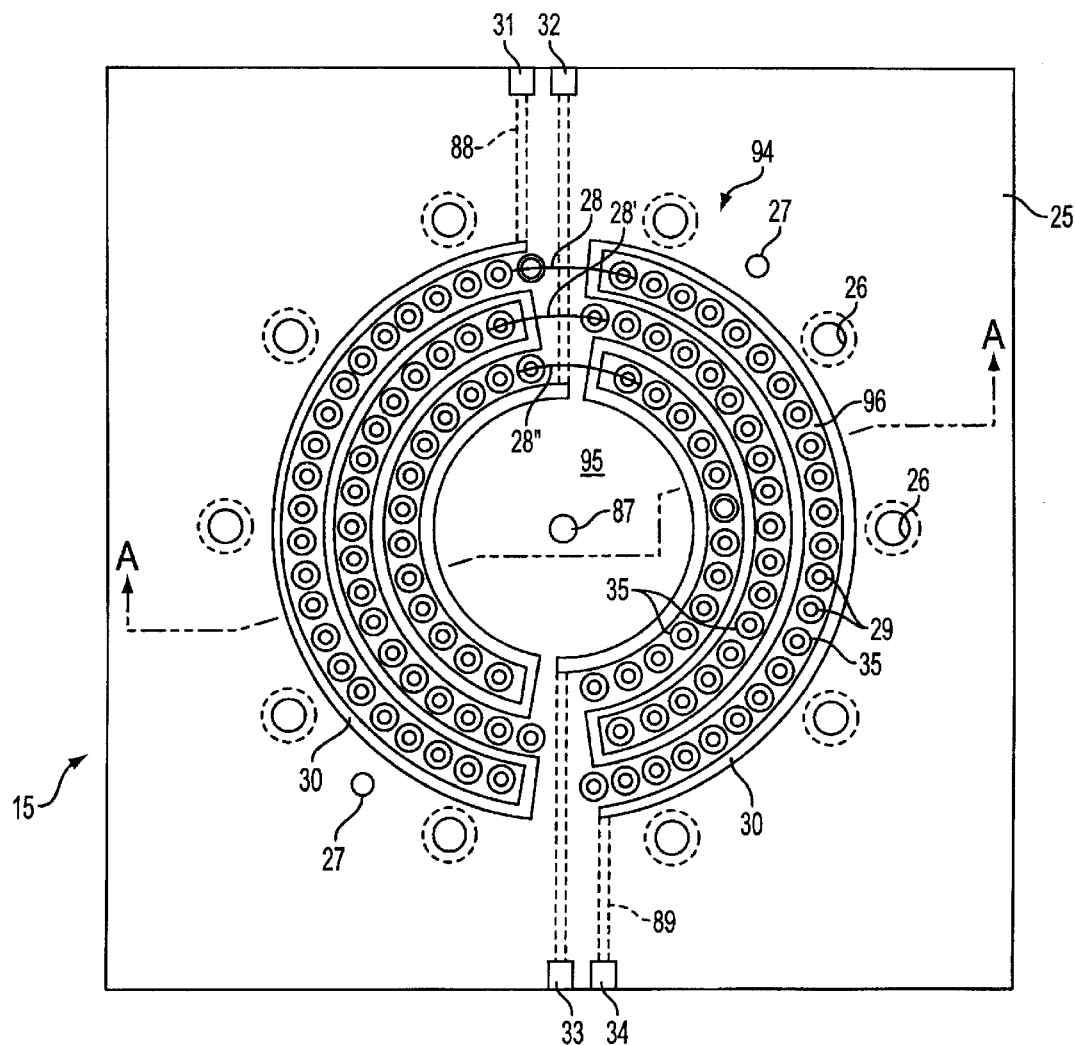
FIG. 3 is a die arrangement.
Figure 4:
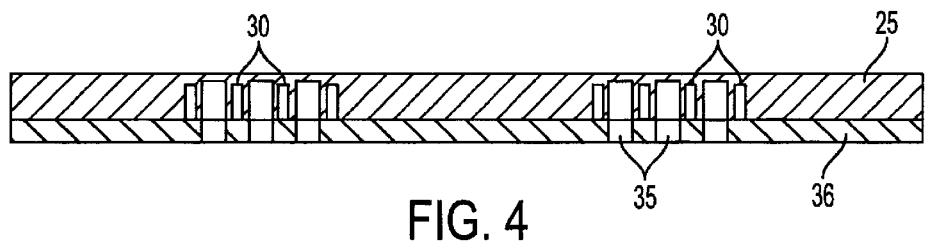
FIG. 4 is sectional view A—A of FIG. 3.

FIGS. 3 and 4 present a possible die arrangement 15, with FIG. 4 showing a section along line A—A in FIG. 3. Die arrangement 15 exhibits a die plate 25 with a cover plate 36, which is secured by screws 26 to the last casing section 43, if necessary via adapters 44 and 47; and via centering devices 27 (see FIG. 6). Die plate 25 accommodates bore holes 35 for the dies 29 arranged on circles 28, 28' and 28" concentric relative to the middle 87 of die plate 25, wherein the middle area 95 of die plate 25 is closed, so that the die circles 28, 28' and 28" are located as far out on the outside peripheral area 94 of die plate 25 as possible. The diameter 96 of outside die circle 28 is here greater than the diameter 97 of the free cross section at the extruder output (see FIG. 6). In addition, dies 29 can be cooled and/or heated. To this end, cooling and heating channels 30 are incorporated on both sides of bore holes 35 for dies 29. Along with feed and discharge lines 31, 32, 33 and 34, channels 30 form two circulation systems 88 and 89. This arrangement ensures an optimal temperature distribution on the die plate.

Figure 5:
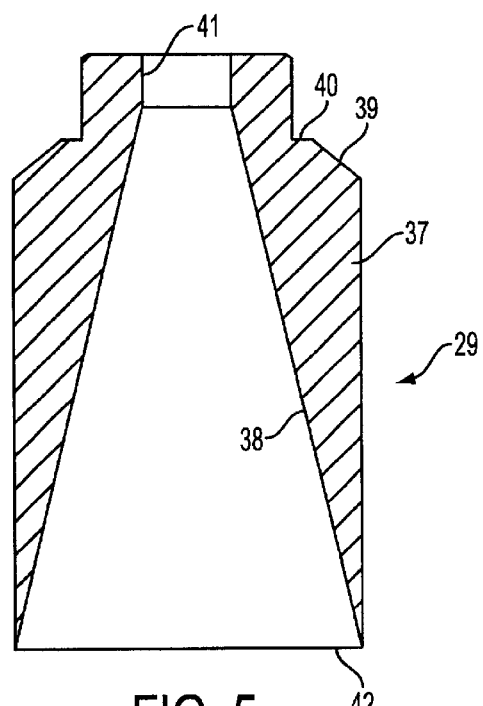
FIG. 5 is a die insert.

FIG. 5 shows a section of the actual die 29. The design of the die allows only the surface of die holes 38 and 41 to be cooled or heated, and not the entire die body. Die 29 is cylindrically shaped on the outside surface 37, with an incremental narrowing 40. A beveling 39 is incorporated at the transition to narrowing 40. The die input 42 is funnel-shaped on the inside surface, while the die output 41 is cylindrical. The die temperature setting is of considerable importance in the process. It measures 120° C. to 210° C., preferably 180° C. to 200° C.

Figure 6:
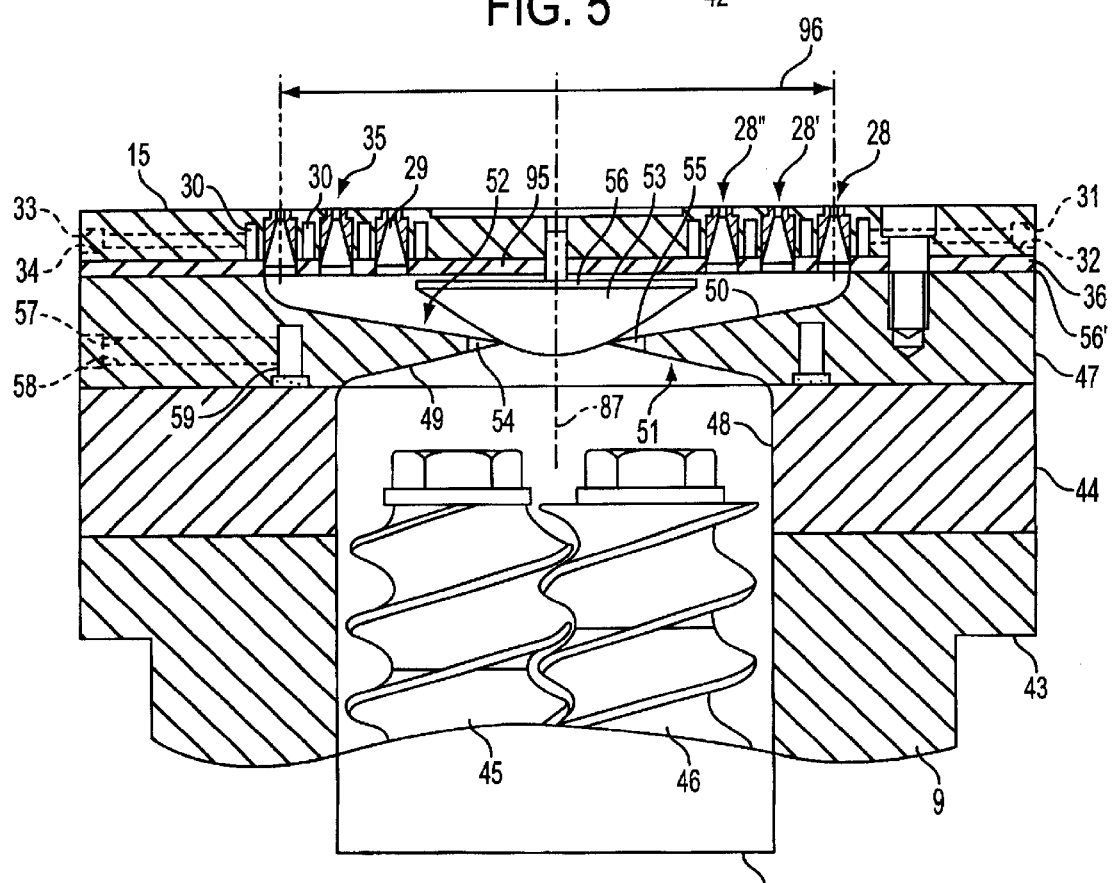
FIG. 6 is a sectional view depicting the transition from the extruder output to the die arrangement.

FIG. 6 shows the transition from extruder 9 to die arrangement 15. A compensator 44 and adapter 47 are located between die arrangement 15 and the last extruder casing section 43. The two extruder screws 45 and 46 are indicated. Adapter 47 exhibits two funnel-shaped areas 51 and 52, wherein the larger cross section of area 51 faces the extruder, while the larger cross section of area 52 faces the die arrangement. The maximal diameter of opening 49 in area 51 is identical to diameter 97 of free extruder cross section 48. A baffle 53 is accommodated in middle area 95 of nozzle arrangement 15, and in area 52. Baffle 53 in conjunction with adapter 47 produces a ring-shaped opening 54. This ring-shaped, resistance-generating passage 55 ensures a uniform distribution of the extrusion mass on the periphery of nozzle arrangement 15. The contours of the funnel-shaped areas are streamlined according to the extrusion mass in order to avoid dead zones in corners. In addition, the selected geometry of the adapter, in particular of area 51, is such that a uniform pressure is established on all dies 29. All components 43, 44, 46, 53 and 15 can be thermally decoupled from each other. FIG. 6 shows disk-shaped insulators 56 and 56' between die arrangement 15 and adapter 47, and between die arrangement 15 and baffle 53. In addition, adapter 47 can be cooled or heated by means of circulation provided by feed line 57, discharge line 58 and channel 59.

Figure 7:
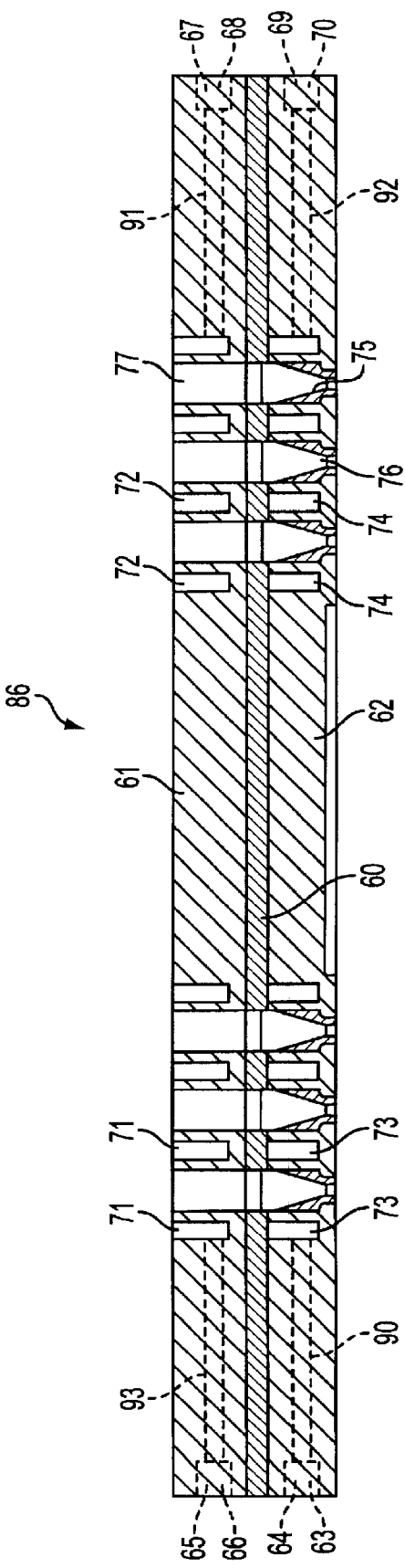
FIG. 7 is an additional die arrangement.

FIG. 7 shows another die arrangement 86. It comprises of two die plates 61 and 62, which in turn can be thermally decoupled by a disk-shaped insulator 60. In addition, both die plates have channels 71, 72, 73 and 74 and lines 63, 64, 65, 66, 67, 68, 69 and 70 to provide a circulation system 90, 91, 92 and 93 for heating or cooling. The die inserts 76 are visible in die holes 75. The die plate 61 facing the extruder exhibits cylindrical bore holes 77. This die arrangement 86 is used in particular to make a nearly fluid product at the extruder output behind the die arrangement capable of pelletization.

FIGS. 8 and 9 show the cutting mechanism 16. It exhibits a knife head 79, knife holders 80 and knife blades 81. The knife holders 80 are secured to the knife head, for example by screws 83, and the knife head in turn accommodates the knife blades 81 with screws 84. The knives can radiate outward or, as depicted by the imaginary radii 82 in the figure, form a specific angle 99, wherein the selected angle 99 ensures an optimal number of knives. The knife head 79 can have heating and cooling means. This can take place via blowing, circulation of cooling or heating agents, or heating cartridges 85.

In addition, the extruder output can exhibit a sprayer that sprays the exiting hot product with water, during which the evaporation heat is used to cool the product. The sprayer is not depicted on the drawing.

In particular, the advantages associated with the invention have to do with the ability to homogenize, mix and make pelletizable extrusion masses comprised of sticky, clot-forming starting products, with the pellets being formed as uniformly as possible. The process is suited in particular for multiple-component materials with the most varied of physical properties.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A device for at least one of homogenizing, mixing and granulating chemical substances having at least one component, comprising:

an extruder having several extruder casing sections, said extruder having at least first and second openings for metering, the first opening being separated from said second opening by at least one thermally insulated casing section, the insulated casing section being at least one of separately heatable and coolable;

at least one extruder screw;

a die arrangement including: two die plates thermally insulated from each other, and a plurality of dies, wherein both die plates are at least one of separately heatable and coolable, and wherein each die comprises a funnel-shaped die section that is thermally decoupled from an upstream component by an insulator; and at least one cutting mechanism.

2. Device according to claim 1, comprising:

at least two extruder screws, wherein the extruder screws are thermally insulated from each other by the extruder casing sections.

3. Device according to claim 1, wherein the at least one casing section of the extruder can be evacuated.

4. Device according to claim 1, wherein the dies are situated in bore holes, wherein the bore holes are provided on at least one circle concentric to an extruder axis, and a diameter of an outside die circle is greater than a diameter of a cross-section of a last casing section.

5. Device according to claim 1, wherein outside surfaces of the dies are essentially cylindrical.

6. Device according to claim 1, wherein the die arrangement includes:

means for at least one of heating and cooling dies of the die arrangement; and channels for carrying heating/cooling agent which are provided on both sides of the dies arranged on concentric circles around an extruder axis, and which are connected to form at least one circulation system.

7. Device according to claim 1, comprising:

a thermal insulation allocated to the die arrangement, and provided relative to a last casing section.

8. Device according to claim 1, wherein the dies are situated on circles concentric to an extruder axis only in a peripheral area, the device comprising:

a baffle facing the extruder in a middle area of the die arrangement, the baffle being thermally insulated relative to the die arrangement.

9. Device according to claim 1, wherein the dies are situated on circles concentric to an extruder axis only in a peripheral area, the device comprising:

an adapter situated between an extruder output and the die arrangement, whose free cross section first decreases from a free cross section of the extruder output, and then increases again up until a largest free cross section of the die arrangement, to form two funnel-shaped areas.

10. Device according to claim 9, wherein the die arrangement includes:

a baffle facing the extruder in a middle area of the die arrangement, the baffle being thermally insulated relative to the die arrangement, wherein the baffle is provided in an area facing the die arrangement, and the baffle together with a narrowest opening of the adapter forms a ring-shaped passage.

11. Device according to claim 9, wherein the funnel-shaped die sections are thermally decoupled by an insulator from the adapter.

12. Device according to claim 1, wherein the cutting mechanism includes:

a knife head; and at least one knife holder with a knife blade, wherein each knife holder and knife blade are situated on a periphery of the knife head, and radiate outward in at least one of a direction of the knife head, and at a certain angle to a radius of the knife head.

13. Device according to claim 12, wherein at least one of a knife holder and knife blade includes:

means for at least one of heating and cooling.

14. Device according to claim 1, wherein each die comprises a cylindrical die section, and wherein the cylindrical die sections are located on one of the two die plates and the funnel-shaped die sections are located on the other die plate.

15. Device according to claim 14, comprising means for heating the die plate containing the funnel-shaped die sections and means for cooling the die plate containing the cylindrical die sections.

16. Device according to claims 1, wherein the die arrangement is at least one of heatable and coolable only substantially at an inner surface of each funnel-shaped die section.

17. Device according to claim 1, wherein a temperature setting downstream from the insulator is higher than a temperature setting upstream from the insulator.

18. Device according to claim 1, wherein the temperature setting of each funnel-shaped die section is between about 120 and 210 degrees Celsius.

19. Device according to claim 18, wherein the temperature setting of each funnel-shaped die section is between about 180 and 200 degrees Celsius.

20. A device for extruding material, the device comprising:

an extruder; and a die arrangement coupled to the extruder, the die arrangement comprising a first die plate, a second die plate, first means for controlling the temperature of the first die plate, second means for controlling the temperature of the second die plate, and a plurality of dies, wherein each die comprises a section with a cylindrically-shaped inner surface located on the first die plate and a section with a funnel-shaped inner surface located on the second die plate, the first and second die plates being thermally decoupled from one another by an insulator.

21. The device of claim 20, wherein the first plate is upstream from the second die plate.

22. A device for extruding material, the device comprising:

an extruder having at least first and second openings for metering, the first opening being separated from said second opening by at least one thermally insulated casing section, the insulated casing section being at least one of separately heatable and coolable;

a die arrangement comprising a plurality of dies, wherein each die has a substantially funnel-shaped inner surface;

an adapter positioned between the extruder and the die arrangement, the adapter being thermally decoupled from the die arrangement by an insulator; and means for separately controlling the temperatures of the adapter and the die arrangement.

* * * * *